Nov. 20, 1923.
S. J. THOMAS
1,474,739
STOP SIGNAL AND REAR LIGHT
Filed April 17, 1922   2 Sheets-Sheet 1
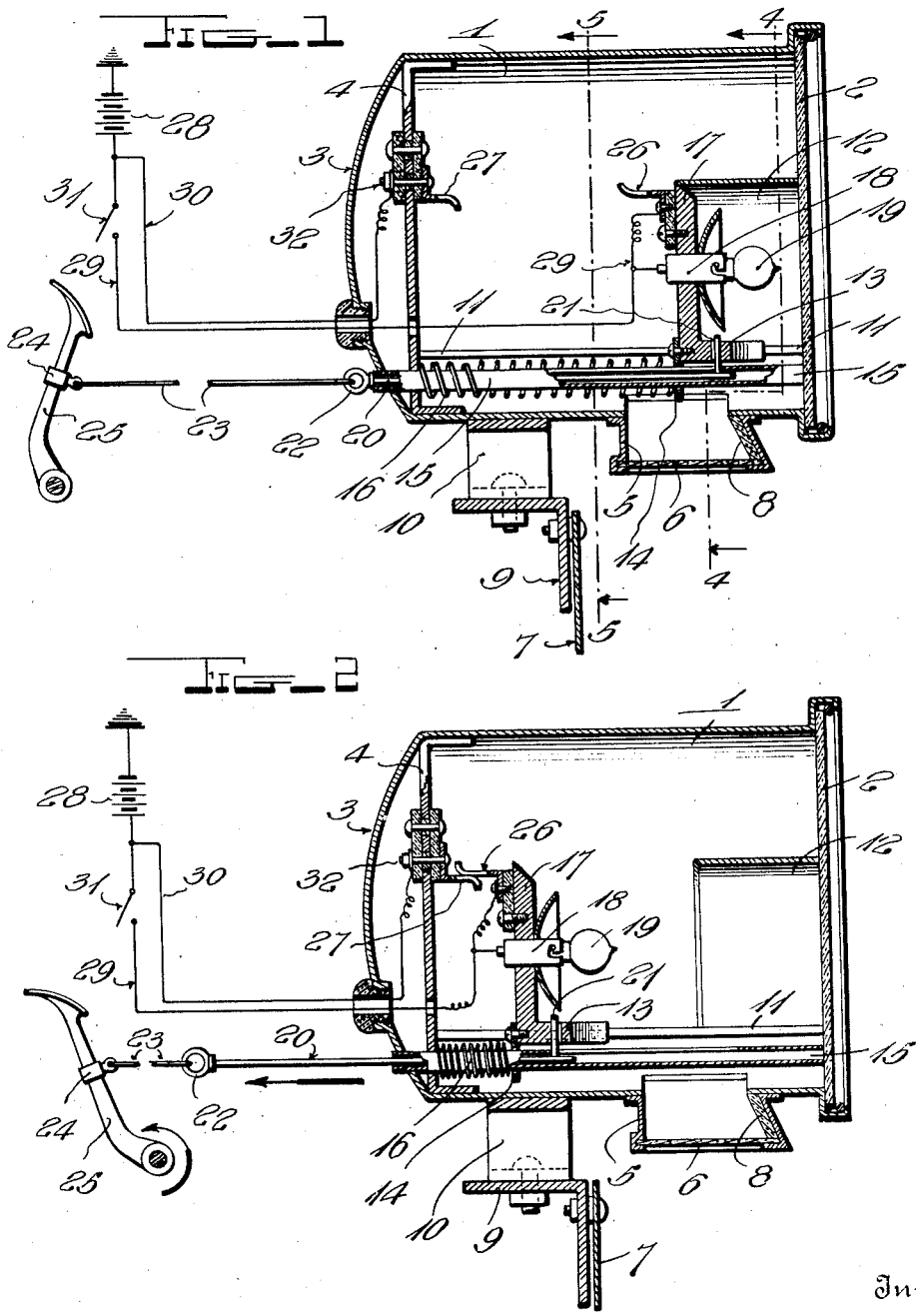
Inventor
Stephen J. Thomas
Witness
By H. B. Willson & Co.
Attorneys

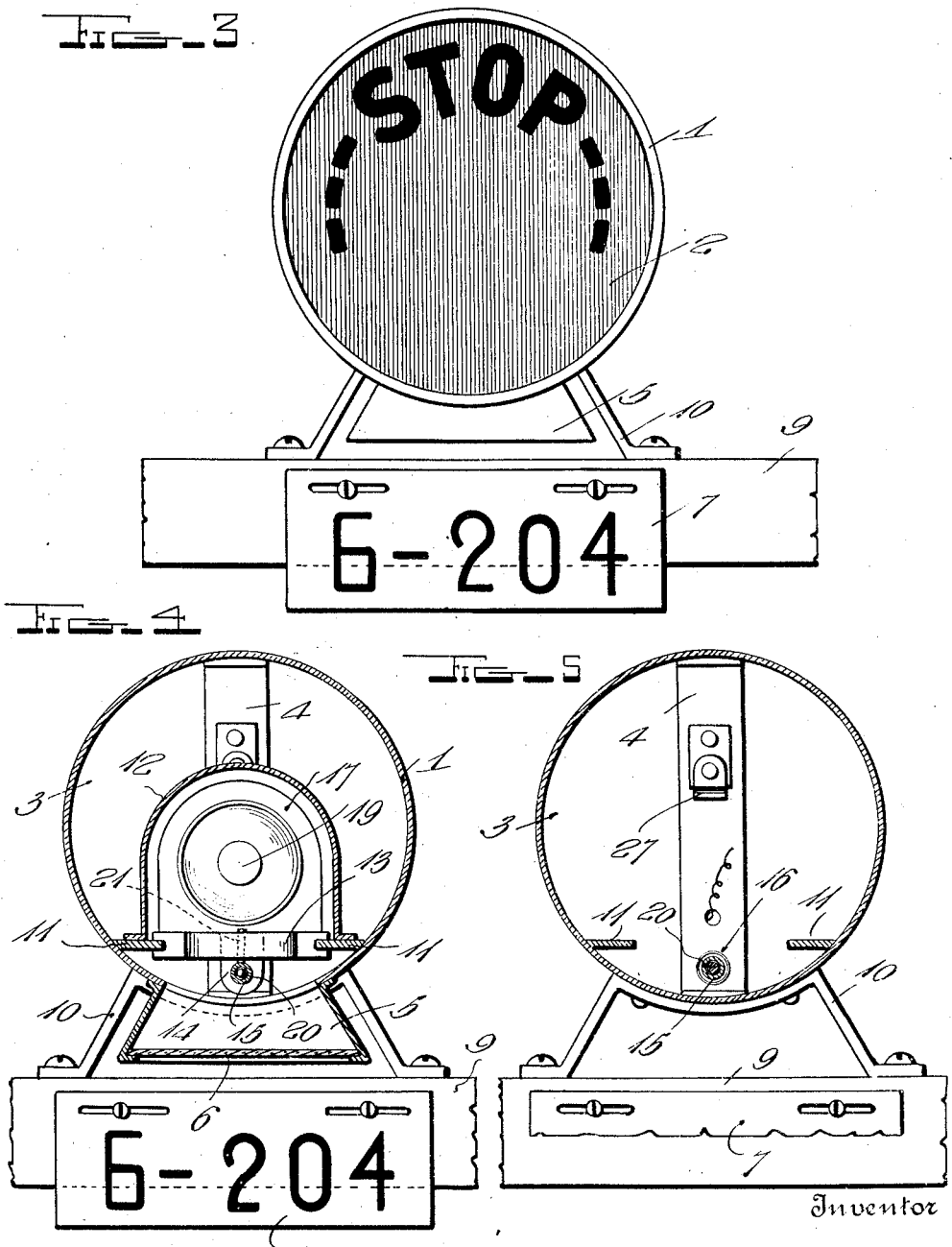

Patented Nov. 20, 1923.

1,474,739

UNITED STATES PATENT OFFICE.

STEPHEN J. THOMAS, OF YOUNGSTOWN, OHIO.

STOP SIGNAL AND REAR LIGHT.

Application filed April 17, 1922. Serial No. 554,274.

*To all whom it may concern:*

Be it known that I, STEPHEN J. THOMAS, a citizen of the United States, residing at Youngstown, in the county of Mahoning and State of Ohio, have invented certain new and useful Improvements in a Stop Signal and Rear Light; and I do declare the following to be a full, clear, and exact description of the invention, such as will enable others skilled in the art to which it appertains to make and use the same.

This invention relates to an improved lamp for use as a stop signal and rear light for an automobile and one object of the invention is to provide a lamp so constructed that it may serve as a rear light and license number illuminating light and may also be used to signal when the automobile is to stop or make a turn.

Another object of the invention is to so construct this signal light that when the car is moving forwardly only a small rear light may be provided whereas when a stop or turn is to be made and the brake pedal moved to apply the brakes, the lamp may be moved forwardly and electric contacts brought together so that a portion of the signal plate having the word "Stop" shown thereon may be illuminated and thus the driver of a car following given warning that the car ahead is to stop or make a turn.

Another object of the invention is to so construct this signal lamp that the carriage carrying the lamp bulb may be slidably mounted within the main body of the lamp and normally held in the position to serve as a rear light by a spring coiled about a rod which extends through the main casing of the lamp and is connected with a cable led forwardly and connected with the foot brake pedal.

Another object of the invention is to so construct this lamp that a portion of the light may be directed through the bottom of the main casing to illuminate the license plate carried by the bracket upon which the lamp is mounted.

Another object of the invention is to so construct this signal lamp that it will be neat in appearance and easy to install.

Another object of the invention is to so construct this lamp that a simple wiring diagram may be provided and include a switch so that the lamps may be prevented from being illuminated when in the normal position during the daytime but the stop signal caused to operate during the day and also during the night.

This invention is illustrated in the accompanying drawings wherein:

Figure 1 is a longitudinal sectional view through the improved lamp in its normal position.

Figure 2 is a view similar to Fig. 1 showing the brake pedal moved to apply the brakes and the bulb carrying carriage moved to bring a contact thereof into engagement with a stationary contact carried by the lamp housing and cause illumination of the entire interior of the lamp housing.

Figure 3 is a view showing the improved signal lamp in elevation.

Figure 4 is a vertical sectional view taken along the line 4—4 of Fig. 1.

Figure 5 is a sectional view taken along the line 5—5 of Fig. 1.

This improved lamp is provided with a casing 1 having a signal plate 2 at its front upon which will be marked the word "Stop" as shown in Fig. 3. The back 3 will be in the form of a reflector and a strip 4 is secured in this housing and extends vertically therein adjacent the reflector 3. In the bottom of the casing, there has been provided an opening so that light can pass down into a depending neck extension 5 having a glass 6 closing its lower end so that light can pass through this glass and be directed against the license plate 7 by means of a reflector strip 8 secured in the front portion of the depending neck. The license plate will preferably be mounted upon a spare tire carrying frame which is of a conventional structure and indicated in general by the numeral 9 and the lamp will also be connected with this spare tire carrying frame by means of a bracket 10 which fits beneath the casing of the lamp as shown clearly in Figs. 4 and 5. Track strips 11 extend longitudinally of the lamp casing 1 at opposite sides thereof and adjacent the bottom and these track strips serve not only as means for slidably mounting a carriage 12 but also serve to support a strip 13 which is shaped and positioned as shown in Figs. 1, 2 and 4 and serve as a shield to prevent the entire signal plate 2 from being illuminated when not so desired.

The carriage 13 which is slidably mounted by the tracks 11 is movable longitudinally of the lamp housing or casing 1 and is provided with a depending ear 14 provided with an opening through which extends the tube 15 which extends longitudinally of the casing 1 beneath and between the track strips 11. A spring 16 is positioned about this tube or sleeve 15 within the housing or casing 1 and has one end engaging the strip or strut 4 and its other end engaging the depending ear 14 so that the carriage will normally be held in the position shown in Fig. 1 with the upright block or carrier 17 closing the rear end of the space enclosed by the shield 12. This block or carrier 17 has a socket 18 of a conventional construction so that the bulb 19 may be mounted as shown and from an inspection of Fig. 1, it will be readily seen that when the carriage is in the position shown in this figure, the bulb will be positioned within the shield and only that portion of the signal plate 2 within the shield 12 will be illuminated. A portion of the light from the bulb when in this position will pass downwardly into the neck 5 and it will thus be seen that the license plate 7 will be illuminated when the carriage is in the normal position and the bulb 19 serving only as a rear light. In order to move the carriage forwardly against the action of the spring 16, there has been provided a pull rod 20 which is slidably mounted in the tube or sleeve 15 and provided with an upstanding pin 21 which extends through a slot formed in this tube and extends into an opening formed in the carriage. This pull rod is provided with an eye 22 at its outer end and this eye is engaged by a cable 23 which extends forwardly of the automobile and connected with a clamp 24 carried by the brake lever 25. Therefore, when the driver of the automobile is about to make a turn or bring the car to a stop and applies the brakes by placing his foot upon the brake pedal, the rod will be moved forwardly of the lamp casing thus drawing the carriage forwardly and into the position shown in Fig. 2. When in this position, the lamp will be so placed that the lights from the bulb will flood the entire interior of the casing 1 and the entire signal plate 2 will be illuminated thus causing the word "Stop" printed upon this signal plate 2 to be disclosed and giving a warning to the driver of a following car. When in the position shown in Fig. 2, the contact strip 26 carried by the upright carrier 17 will engage the contact strip 27 which is insulated from the strut 4 thus causing the bulb 19 to be very brightly lighted. The battery 28 is grounded at one side so that a circuit can be completed through the single contact socket 18 which will also be grounded in the usual manner and upon the opposite side of the battery extends a conductor wire 29 which extends into the rear end portion of the casing 1 and is connected with the socket 18 and contact 26. A branch wire 30 extends from this wire 29 intermediate the battery 28 and switch 31 and also extends into the casing 1 and also passes into the casing and is connected with the terminal pin 32 of the contact 27. When the switch 31 is closed as it would be at night, the circuit from the battery is through the wire 29 and the bulb 19 will be at all times illuminated and will serve as a rear light and license plate illuminating device when in the position shown in Fig. 1 and as a stop signal light when in the position shown in Fig. 2. During the day, the switch 31 will be left open and therefore the bulb 19 would not be illuminated when in the position shown in Fig. 1. When however the brake pedal is moved to apply the brakes, this movement will bring the contact 26 into engagement with the contact 27 and this will close the circuit through the wire 30 and permit the bulb to be illuminated and disclose the warning signal during the daytime. It will thus be seen that the device will operate as a warning signal both at night and during the day and in addition may serve as a rear light and license tag lamp during the nighttime. When applying the device to the automobile, it is simply necessary to mount the lamp upon the spare tire carrier above the license plate and connect the cable 23 with a clamp 24 which will be positioned about the brake pedal. The wires 29 and 30 can then be connected with the battery and the switch 31 put in place and the device is ready for use.

I claim:

1. A lamp comprising a casing, a signal plate closing its rear end and having a warning marked thereon, a shield in the casing extending forwardly from an unmarked portion of the signal plate and open at its rear, a carriage movable longitudinally in the casing, a closure for the forward end of the shield carried by said carriage, a bulb socket carried by said closure and having its bulb carrying end extending rearwardly for extending into the shield when the closure is in a closing position, means to yieldably hold the carriage against forward movement with the closure in a closing position, means for moving the carriage forwardly to permit light from a bulb carried by the socket to flood the interior of the casing and disclose the warning marked upon the signal plate, and an energizing circuit for the bulb.

2. The structure of claim 1 having the energizing circuit including a source of energy, a switch controlled wire leading therefrom and a wire leading from the first wire intermediate the switch thereof and source of energy, a contact insulated from the lamp casing, and a contact carried by the socket carrying shield closure, the first wire being connected with the bulb socket and contact carried by the closure and the second wire being connected with the contact of the lamp casing whereby a bulb carried by the socket may be continuously lighted when the switch is closed and extinguished when the switch is open and the contacts of the lamp casing and shield closure out of contact.

3. The structure of claim 1 having the carriage slidably mounted upon track strips extending longitudinally in the lamp casing, a tube extending longitudinally in the casing, an ear carried by the carriage and slidably engaging said tube, a spring upon the tube engaging the ear to normally retain the carriage in a rearward position with the closure closing the forward end of the shield, and means carried by the tube for moving the carriage forwardly against the action of the spring.

4. A signal comprising a casing, a signal plate closing one end thereof and disclosing a warning when fully illuminated, a lamp carrier movable in said casing towards and away from said signal plate, means for causing light from an illuminated lamp to pass through only a portion of the signal plate when the lamp carrier is moved towards the signal plate its full extent, and means for moving the lamp carrier away from said signal plate to permit light from the lamp to pass through the entire signal plate.

5. The structure of claim 4 including an energizing circuit for the lamp, said circuit having a lead wire extending from a source of power and connected with the lamp and provided intermediate its length with a control switch, a contact connected with said wire and carried by the lamp carrier, a branch wire leading from the first wire, and a contact having the branch wire connected therewith and being positioned for engagement by the first contact when the lamp carrier is moved away from the signal plate.

6. A structure of the character described including a casing, a signal plate for one end of said casing and disclosing a warning when fully illuminated, a contact insulated from said casing, a lamp carrier movable in said casing towards and away from said signal plate and including a bulb-carrying socket, means for causing light from the illuminating lamp to pass through only a portion of the signal plate when the lamp carrier is moved toward the signal plate its full extent, a contact carried by said lamp carrier, and adapted to engage the first mentioned contact when the lamp carrier is moved away from said signal plate, and an energizing circuit including a switch controlled lead wire connected with the bulb socket and contact of said lamp carrier and a second lead wire connected with the first mentioned contact.

7. A structure of the character described comprising a casing, a signal plate having warning means associated therewith and displayed when the lens is fully illuminated, a lamp carrier movable towards and away from said signal plate, means for preventing the entire illumination of said lens when the lamp carrier is moved to a position adjacent the signal plate, and means for moving the lamp carrier away from said signal plate to permit entire illumination of the lens and displaying of the warning.

8. A combined tail light and signal comprising a casing having a wall including a tail light forming portion and a danger signal forming portion, a lamp carrier in the casing movable towards and away from the said wall, means for causing light to pass through only the tail light forming portion when the lamp carrier is moved towards the said wall its full extent, and means for moving the lamp carrier away from the said wall to permit light to pass through the danger signal forming portion and tail light forming portion.

9. A combined tail light and danger signal comprising a casing having a wall including a tail light forming portion and a danger signal forming portion, a lamp carrier in the casing movable towards and away from the tail light forming portion of said wall, and means cooperating with the lamp carrier for causing only the tail light forming portion of said wall to be illuminated when the lamp carrier is moved towards the tail light forming portion its full extent.

10. A combined tail light and danger signal comprising a casing having a wall including a tail light portion and a danger signal portion, a lamp, means for normally confining the light from said lamp to said tail light portion including a carrier for said lamp movable from a position in which the lamp illuminates the tail light only to a second position in which it illuminates the danger signal.

In testimony whereof I have hereunto set my hand.

STEPHEN J. THOMAS.